US008064646B2

(12) United States Patent
Hagino et al.

(10) Patent No.: US 8,064,646 B2
(45) Date of Patent: Nov. 22, 2011

(54) TECHNIQUE FOR AUTHENTICATING AN OBJECT ON BASIS OF FEATURES EXTRACTED FROM THE OBJECT

(75) Inventors: Masao Hagino, Kanagawa-ken (JP);
Hiroaki Kashima, Kanagawa-ken (JP);
Shigeki Takeuchi, Kanagawa-ken (JP);
Daisuke Tomoda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 11/764,283

(22) Filed: Jun. 18, 2007

(65) Prior Publication Data
US 2008/0253619 A1      Oct. 16, 2008

(30) Foreign Application Priority Data

Jun. 27, 2006   (JP) .................................. 2006-177157

(51) Int. Cl.
*G06K 9/00*       (2006.01)
*G05B 19/00*      (2006.01)
*G06F 21/00*      (2006.01)
(52) U.S. Cl. ............... 382/116; 902/3; 340/5.2; 713/186
(58) Field of Classification Search .................. 382/115, 382/116; 902/3; 340/5.82; 713/186
See application file for complete search history.

(56) References Cited

U.S. PATENT DOCUMENTS

| | | | | |
|---|---|---|---|---|
| 5,815,252 A | * | 9/1998 | Price-Francis | 356/71 |
| 6,038,334 A | * | 3/2000 | Hamid | 382/124 |
| 6,100,811 A | * | 8/2000 | Hsu et al. | 340/5.83 |
| 6,259,805 B1 | * | 7/2001 | Freedman et al. | 382/124 |
| 6,393,139 B1 | * | 5/2002 | Lin et al. | 382/124 |
| 6,836,554 B1 | * | 12/2004 | Bolle et al. | 382/116 |
| 6,944,773 B1 | * | 9/2005 | Abrahams | 713/168 |
| 7,016,885 B1 | * | 3/2006 | Mikhael et al. | 706/20 |
| 7,035,443 B2 | * | 4/2006 | Wong | 382/124 |
| 7,646,893 B2 | * | 1/2010 | Yamada et al. | 382/115 |
| 2002/0164058 A1 | * | 11/2002 | Aggarwal et al. | 382/125 |
| 2003/0163710 A1 | * | 8/2003 | Ortiz et al. | 713/186 |
| 2003/0194113 A1 | * | 10/2003 | Yamaguchi et al. | 382/118 |
| 2004/0042642 A1 | * | 3/2004 | Bolle et al. | 382/115 |
| 2006/0228005 A1 | * | 10/2006 | Matsugu et al. | 382/116 |
| 2006/0239512 A1 | * | 10/2006 | Petrillo | 382/115 |
| 2007/0030115 A1 | * | 2/2007 | Itsuji et al. | 340/5.8 |
| 2007/0217708 A1 | * | 9/2007 | Bolle et al. | 382/276 |

FOREIGN PATENT DOCUMENTS

| | | |
|---|---|---|
| JP | H9198501 | 7/1997 |
| JP | H9305771 | 11/1997 |
| JP | 11-338826 | 12/1999 |
| JP | 2000268175 | 9/2000 |
| JP | 2001052182 | 2/2001 |
| JP | 2001067137 | 3/2001 |

(Continued)

*Primary Examiner* — Kathleen Y Dulaney
(74) *Attorney, Agent, or Firm* — Gerald R. Woods

(57) ABSTRACT

The present invention discourages effective illegal use of compromised biometric information in biometric authentication and allows biometric authentication to be securely continued even when some biometric information is compromised. A user authentication system compares extracted user features with a previously registered combination of features and authenticates the user on the basis of the result of the comparison. If the authentication is successful, the previously registered combination is replaced with a new combination of features that are registered for use in the subsequent authentication of the authentication object.

12 Claims, 7 Drawing Sheets

FOREIGN PATENT DOCUMENTS

| | | |
|---|---|---|
| JP | 2001273498 | 10/2001 |
| JP | 2001344605 | 12/2001 |
| JP | 2002-208926 | 7/2002 |
| JP | 2002-312317 | 10/2002 |
| JP | 2002351844 | 12/2002 |
| JP | 2003067744 | 3/2003 |
| JP | 2004-005532 | 1/2004 |
| JP | 2005038257 | 2/2005 |
| JP | 2005122395 | 5/2005 |
| JP | 2006085265 | 3/2006 |

* cited by examiner

TECHNIQUE FOR AUTHENTICATING AN OBJECT ON BASIS OF FEATURES EXTRACTED FROM THE OBJECT

TECHNICAL FIELD

The present invention relates to a technique for authenticating an object on the basis of features extracted from the object. In particular, the present invention relates to a technique for authenticating an object by comparing features extracted from the object with features registered in advance.

BACKGROUND

Recently, in information systems, authentication using biometric information has started to be performed to improve the accuracy of user authentication. Various types of biometric information are available. For example, the use of biological features, such as fingerprint or a pattern of veins, or functional features, such as a signature or a voiceprint, has been proposed. Although it is hard to forge biometric information, the biometric information cannot be changed even when it is compromised; i.e. becomes known to unauthorized third parties. The amount of private information included in biometric information may be considerable as compared with conventional passwords. Thus, it is preferable that information, such as biometric information and features based on the biometric information, be managed by the owner. For example, hitherto, in many cases, biometric information has been recorded in a device such as an IC card carried by the user, and in few cases, biometric information has been recorded in a server managed by a third party.

In a technique disclosed in Japanese Published Patent Application No. 2002-351843, respective parts (called templates) of biometric information are stored separately in a server and a terminal. When authentication is performed, these templates are combined to be used for authentication. When biometric information is re-registered, usually, only the template on the terminal side needs to be updated. In this arrangement, operating costs related to storage and re-issue of templates can be reduced. Japanese Published Patent Application No. 2004-088373 discloses a technique for improving the accuracy of authentication by combining authentication based on biometric information with authentication in which an encryption key or the like is used.

IC cards are resistant to tampering and information loss. However, in a situation in which IC cards are managed by individuals, biometric information may be compromised; i.e., become known to unauthorized third parties. When biometric information is compromised, it is preferable that the compromised biometric information not be used in the subsequent authentication because the compromised biometric information may be used to set up an illegal activity such as spoofing. However, if the compromised biometric information is not available for use in authentication, it may be impossible to continue the subsequent authentication using the same biometric information. Thus, a technique is desired in which, even when biometric information is compromised, effective illegal use of the biometric information by third parties is made difficult, but valid authentication can be continued.

SUMMARY OF THE INVENTION

Accordingly, it is an object of the present invention to provide a system, a method, and a program that can solve the aforementioned problems.

The present invention provides a system for authenticating an authentication object by comparing extracted features that are extracted from the authentication object with registered features that are registered in advance. The system includes an extraction unit that extracts a plurality of features from an authentication object, an authentication unit that compares the extracted features with a plurality of features that are registered in advance in relation to some of the extracted features and authenticates the authentication object on the basis of tire result of the comparison, a selection unit that selects, from the extracted features, a plurality of features forming a different combination other than that of the registered features, if the authentication is successfully completed, and a registration unit that registers the selected features as a plurality of registered features to be used in subsequent authentication of the authentication object.

DETAILED DESCRIPTION

A preferred embodiment of the present invention will now be described. It should be noted that the following description does not restrict the invention defined by the appended claims, and ail combinations of features described in the embodiments are not necessarily mandatory for the implementation of the invention.

Figure 1:
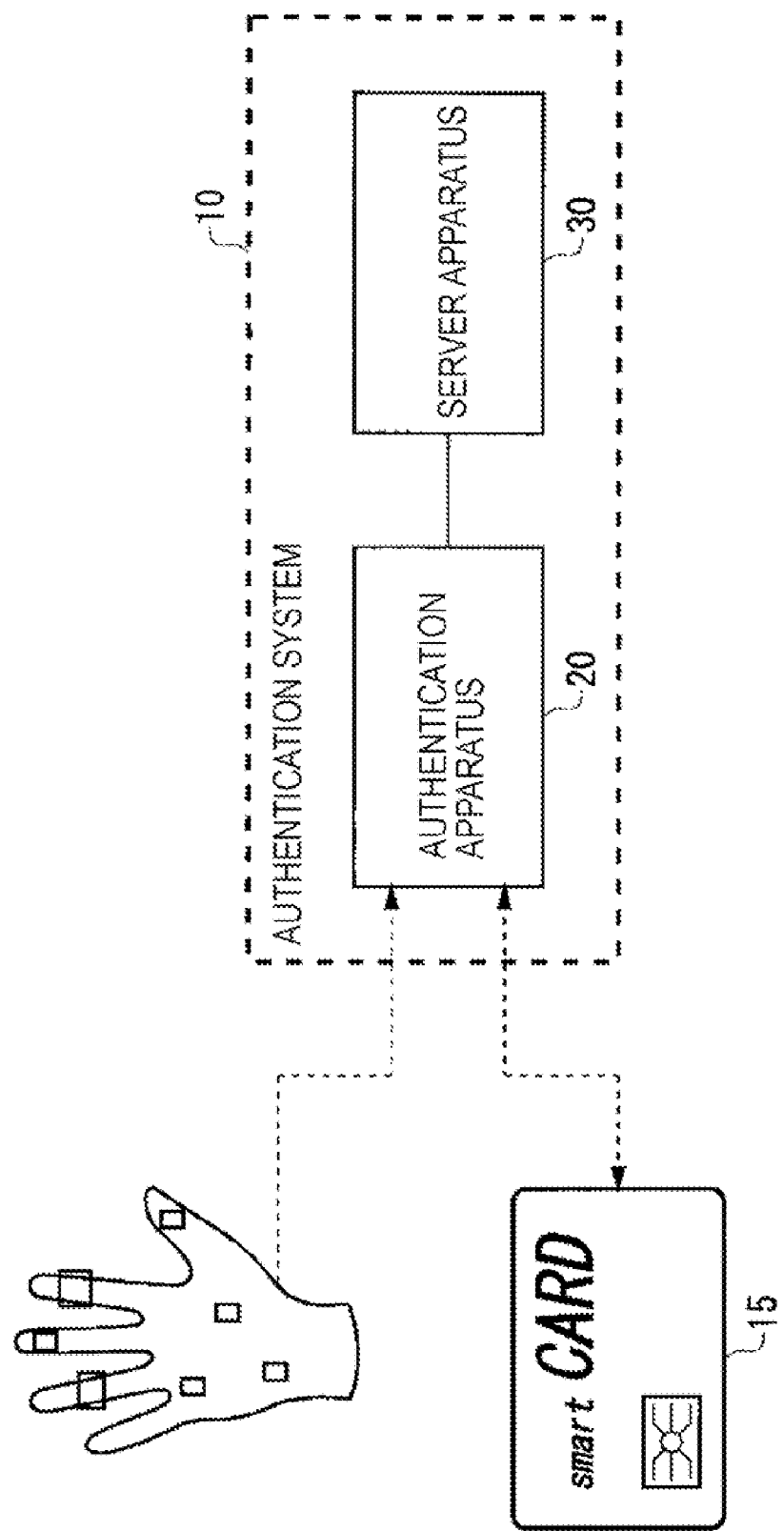
FIG. 1 shows an overall structure of an authentication system according to the present invention.

FIG. 1 shows an overall structure of an authentication system 10. The authentication system 10 includes an authentication apparatus 20 and a server apparatus 30. The authentication apparatus 20 reads biometric information of a user who is an authentication object and extracts a plurality of features of the biometric information. For example, the authentication apparatus 20 may read fingerprints from the fingers of a user with a sensor and extract the features of the fingerprints. Hereinafter, features that are extracted are called extracted features. The authentication apparatus 20 further reads a plurality of features that are registered in advance in relation to some of the extracted features from an IC card 15 via, for example, an IC card reader. The IC card 15 is an example of an information recording medium that is carried by a user and records information used to authenticate the user. An information recording medium is not limited to the IC card in this case and may be, for example, a magnetic card, a mobile phone, or a PDA so long as the information recording medium can record information for authentication and is portable.

The authentication apparatus 20 compares features that are extracted from the user with the registered features read from the IC card 15 and authenticates the user on the basis of the result of the comparison. When the authentication is successfully completed, information on the result is sent to the server apparatus 30, and a user process, for example, referring to a bank account, is enabled. If the authentication is successfully completed, the authentication apparatus 20 further selects a plurality of features from the extracted features, forming a different combination other than that of the registered features read from the IC card 15. The authentication apparatus 20 may select, from the extracted features, a combination of features on the basis of instructions received from the server apparatus 30. Then, the authentication apparatus 20 removes the registered features that have been already registered from the IC card 15, and registers the newly selected features in the IC card 15 as a plurality of registered features to be used in a subsequent authentication of the user.

An objective of the invention is to reduce damage that might be incurred when the biometric information from the IC card 15 is compromised; i.e., lost or stolen. Damage reduction is accomplished by changing a combination of pieces of the biometric information to be used in authentication every time authentication is successfully completed. That is to say, in the authentication system 10, even when specific biometric information is compromised, effective illegal use of the compromised biometric information can be made difficult, and valid biometric authentication can be continued.

Figure 2:
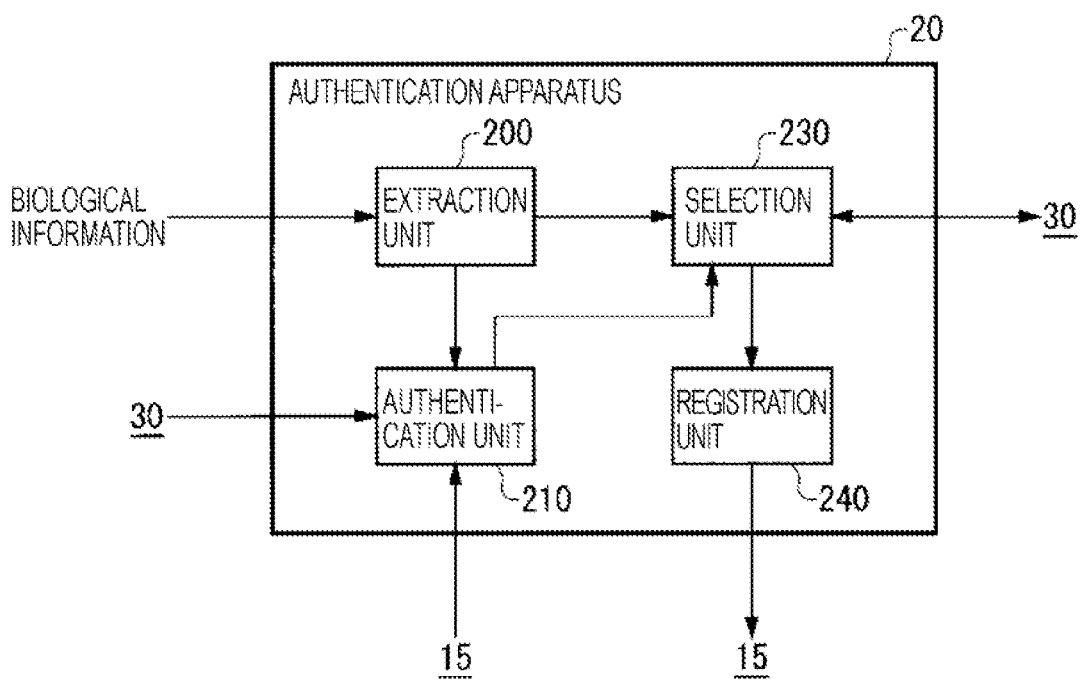
FIG. 2 shows a functional structure of an authentication apparatus in the authentication system of FIG. 1.

FIG. 2 shows a functional structure of the authentication apparatus 20. The authentication apparatus 20 includes an extraction unit 200, an authentication unit 210, a selection unit 230, and a registration unit 240. The extraction unit 200 reads a plurality of features of biometric information from a user who is an authentication object at substantially the same time and extracts a plurality of extracted features. For example, the extraction unit 200 may read the fingerprints of a plurality of fingers and extract the features of the fingerprints. In this embodiment, it is assumed that m extracted features are extracted. The authentication unit 210 reads, from the IC card 15, a plurality of registered features and combination information that indicates a combination of extracted features to be compared with the registered features. Since the registered features to be read correspond to some of the extracted features, the number of registered features to be read may be any number so long as it is smaller than m (for example, k). The combination information represents a combination of pieces of information for identifying feature types and places where features are detected, such as a fingerprint of a thumb or a pattern of veins in a palm. Either or both of the registered features and combination information may be recorded in the server apparatus 30 and supplied from the server apparatus 30 to the authentication unit 210, rather than read from the IC card 15.

Then, the authentication unit 210 selects, from the extracted features, a plurality of features in a combination indicated by the read combination information and compares the extracted features that have been selected with the registered features. For example, the authentication unit 210 determines whether each of the registered features that have been read agrees with one of the extracted features corresponding thereto. When all of the registered features agree with corresponding ones of the extracted features, the authentication unit 210 determines that the authentication is successfully completed. The number (k) of the registered features may be any number so long as it is equal to or more than the minimum number (for example, p) that is needed to authenticate an authentication object in the existing biometric authentication techniques. In a case where k is larger than p, when p or more registered features out of the k registered features agree with corresponding ones of the extracted features, the authentication unit 210 may determine that the authentication of the authentication object is successfully completed. In this case, all of the k registered features need not agree with corresponding ones of the extracted features.

If the authentication is successfully completed, the selection unit 230 selects, from the extracted features, a plurality of features forming a different combination other than that of the registered features. Then, the registration unit 240 registers the features selected by the selection unit 230 as a plurality of registered features to be used in the subsequent authentication of the user who is an authentication object. Specifically, the registration unit 240 may remove the registered features registered in advance from the IC card 15, and record the features selected by the selection unit 230 in the IC card 15 as a plurality of registered features to be used in the subsequent authentication of the user. The registration unit 240 further records, in the IC card 15, combination information indicating the combination of the registered features that have been registered.

In this case, features selected by the selection unit 230 for the subsequent authentication each time authentication is successfully completed may be determined according to a predetermined rule. More specifically, the selection unit 230 may select a plurality of features according to instructions issued from the server apparatus 30 according to the predetermined rule, or select a plurality of features according to instructions issued from software downloaded from the server apparatus 30 according to the predetermined rule. In this case, if information is received that indicates at least some of the extracted features extracted from an authentication object have been compromised, the selection unit 230 preferably changes the predetermined rule to another rule. The input of such information may be received directly from the user, or from the server apparatus 30. Moreover, changing the predetermined rule to another rule may be implemented by changing the setting of the software or sending a change instruction to the server apparatus 30. In this arrangement, even when a certain combination of pieces of biometric information is compromised, illegal use of the pieces of biometric information can be effectively prevented by avoiding the use of the compromised combination in the subsequent authentication.

In a further example, the selection unit 230 reads card identification information for identifying the IC card 15 of a certain user. Then, if the card identification information obtained is different from card identification information read during a previous authentication of the same user, the selection unit 230 changes the predetermined rule to another rule. In this arrangement, if the IC card 15 is stolen, the rule for determining a combination of pieces of biometric information can be changed by reissuing the IC card 15 containing different card identification information. It is not necessary to receive information stating that the IC card 15 is stolen, and thus the structure of the authentication apparatus 20 can be simplified.

Moreover, registered features that are recorded in the IC card 15 by the registration unit 240 are not limited to features for the next authentication and may be, for example, features for at least one additional future authentication attempt. In this case, registered features for two authentications, i.e., the next two authentications are recorded in the IC card 15. Then, each time authentication is successfully completed, the registration unit 240 removes registered features used in the authentication from the IC card 15.

Figure 3:
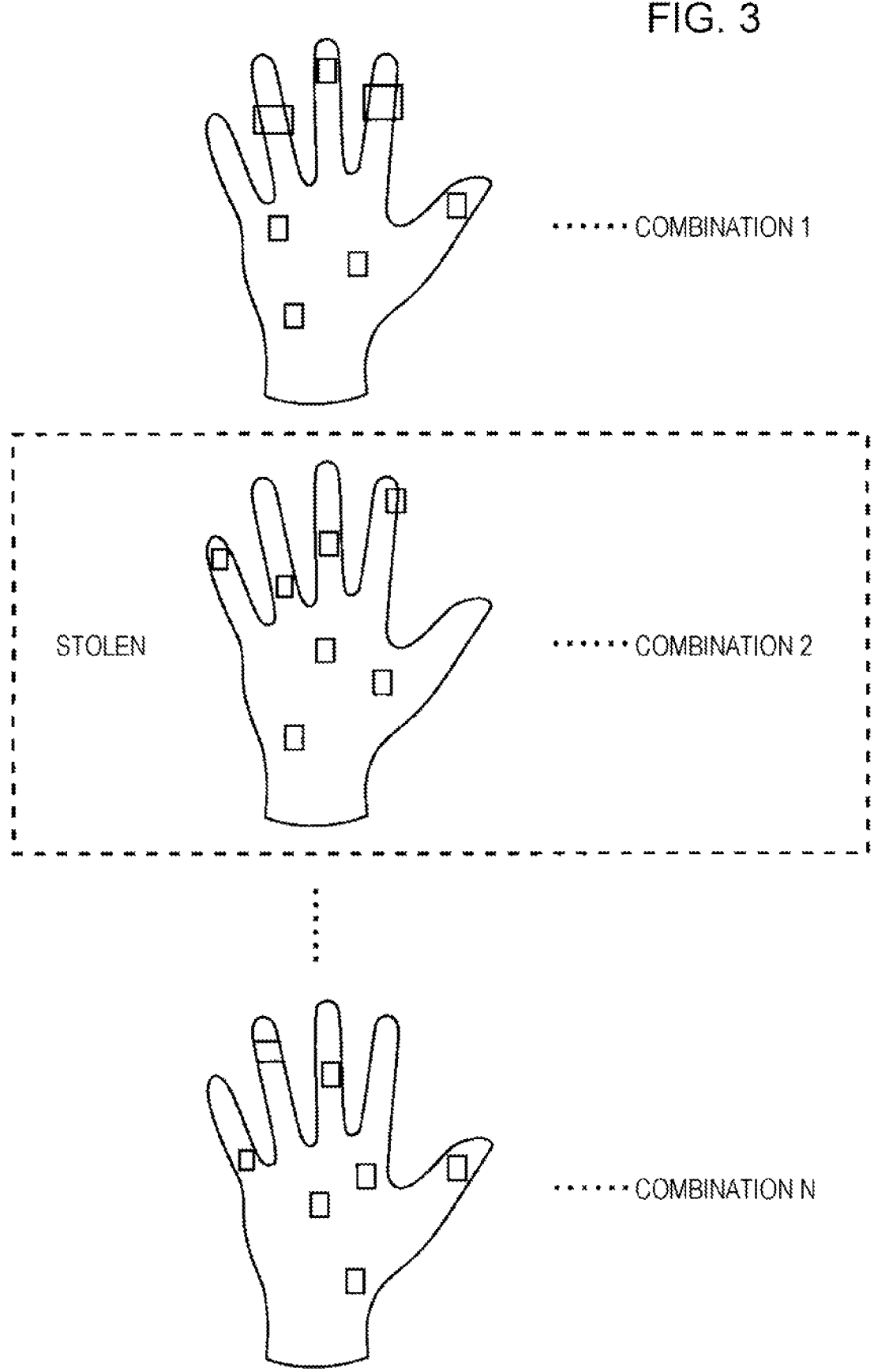
FIG. 3 shows exemplary combinations of features used in the respective authentications.

FIG. 3 shows examples of combinations of features that may be used in the respective authentications. Each time authentication is successfully completed, the selection unit 230 selects a different combination of features to be used in the next authentication. As a result, each time authentication is successfully completed, a different combination of features is registered in the IC card 15. It is assumed that combinations of features that are sequentially recorded in this way are combinations 1 to N. The combination 1 is, for example, a combination of features of seven places, such as the fingerprints of fingers and/or the pattern of veins in a palm of a user. The combination 2 is a combination of features of seven places that are different from those of the combination 1. Similarly, the combinations 3 to N are combinations of features of seven places that are different from each other.

Registered features are not limited to fingerprints or a pattern of veins illustrated in FIG. 3. For example, registered features may be other biometric features, such as an iris, contours of a face, shapes and locations of eyes and/or a nose, or tone information of a face image. Moreover, registered features may be functional features of a user, such as handwriting and/or writing pressure of a signature, a character form, a character stroke order, or a voiceprint, or may be a combination of biometric features and functional features. The forgery of biometric information can be made more difficult by combining various features. In this case, for example, even when only fingerprints are combined, it is preferable that the selection unit 230 combine features included in fingerprints in relation to a plurality of fingers that are different from each other and select the combined features as a combination of a plurality of features to be used in the subsequent authentication.

By changing the combination used in authentication every time authentication is performed, as shown in FIG. 3, even though one combination is stolen and the user does not know of the theft, the probability a successful unauthorized authentication is very low. Moreover, when the user finds that a certain combination (for example, the combination 2) is compromised, the future selection of combinations may be controlled so that the compromised combination is not used in the subsequent authentication, instead of changing the rule for selecting features. For example, in an embodiment in which the server apparatus 30 indicates a combination to the selection unit 230, when the server apparatus 30 has received a notice stating that a certain combination is compromised, the server apparatus 30 will thereafter indicate only uncompromised combinations to the selection unit 230. Alternatively, in an embodiment in which a combination is selected according to instructions from downloaded software, the server apparatus 30 sets the software so that the compromised combination 2 is removed. This enables an arrangement in which the selection unit 230 does not select a plurality of features in the compromised combination for use in the subsequent authentication.

Alternatively, future uses of compromised features may be managed at a feature-by-feature level. For example, if the server apparatus 30 receives a notice stating that features in a certain combination (for example, the combination 2) are compromised, the server apparatus 30 can flag each compromised feature to indicate it should not be used in the subsequent authentication. Then, when the server apparatus 30 generates a combination of features according to the regular rule and the generated combination includes compromised features, the server apparatus 30 will not use the combination and will generate another combination.

Figure 4:
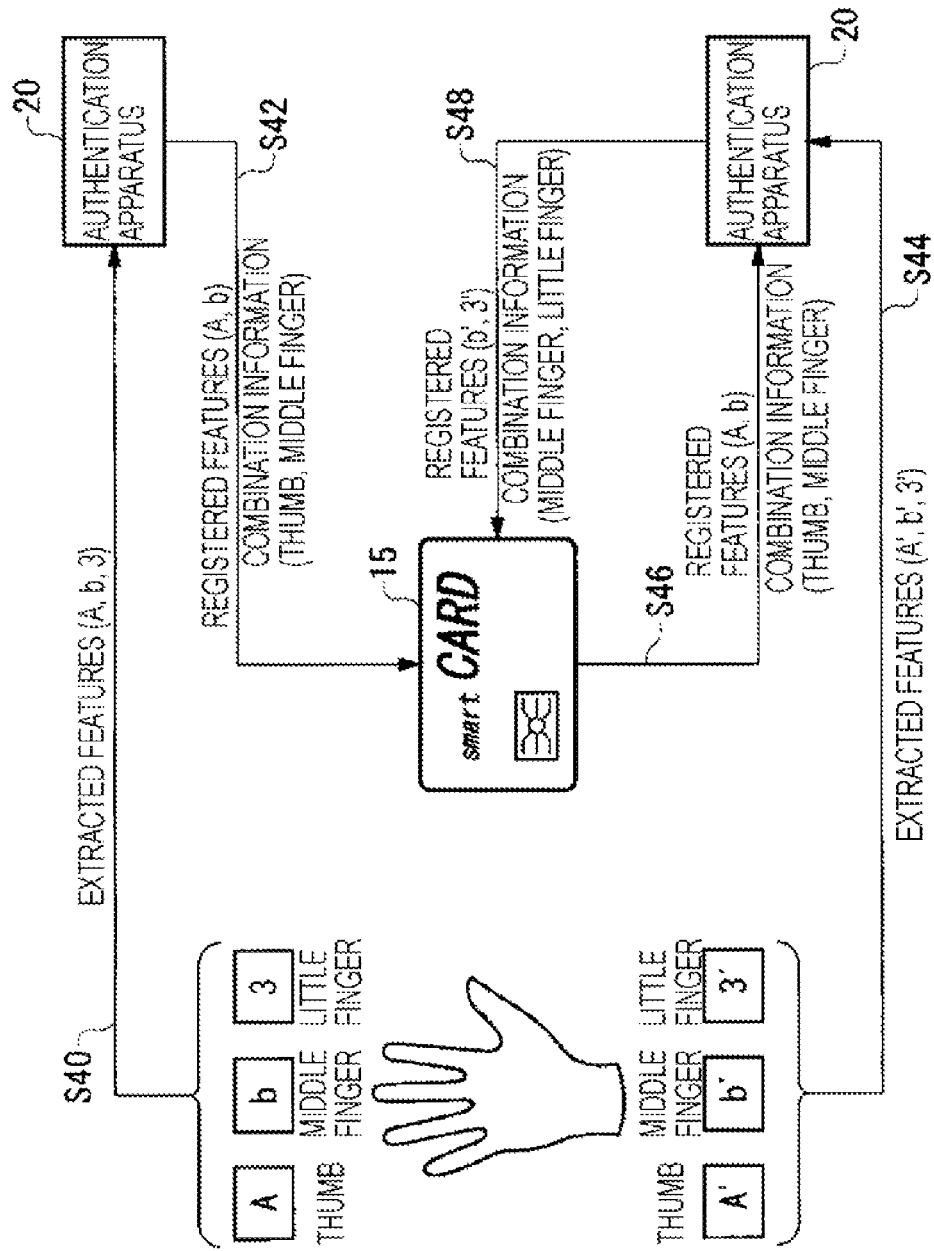
FIG. 4 shows a system and process flow in a case where combination information is registered in an IC card.

FIG. 4 shows a process flow in a case where combination information is registered in the IC card 15. The outline of the process according to the embodiment will now be described with reference to FIG. 4, in which combination information and registered information are recorded in the IC card 15, and FIG. 2, showing the functional structure. As a step of initialization, the extraction unit 200 extracts individual features from a thumb, a middle finger, and a little finger of a user (S40). It is assumed that the extracted features are denoted by A, b, and 3. The selection unit 230 selects a plurality of features from the extracted features according to a predetermined rule, and the registration unit 240 records the selected features in the IC card 15 as a plurality of registered features (S42). It is assumed that the registered features are the features A and b. The registration unit 240 further records, in the IC card 15, combination information indicating a combination of extracted features to be compared with the registered features. The combination information to be recorded is denoted by (thumb, middle finger).

The extraction unit 200 extracts a plurality of features in response to an authentication request from the user (S44). It is assumed that the extracted features are denoted by A', b', and 3'. Moreover, the authentication unit 210 reads the registered features and the combination information from the IC card 15 (S46). As a result, A and b are read as the registered features, and (thumb, middle finger) is read as the combination information. The authentication unit 210 compares a plurality of features (i.e., the feature A' of a thumb and the feature b' of a middle finger) of a combination indicated by the read combination information, from the set of extracted features, with the registered features (A, b). When these features agree with each other as a result of the comparison, the authentication unit 210 determines that the authentication is successfully completed.

If the authentication is successfully completed, the selection unit 230 selects, from the set of extracted features, a plurality of new features forming a different combination from that just used. It is assumed that the extracted features that are selected are (b', 3'). Then, the registration unit 240 records the extracted features in the IC card 15 as registered features to be used in the subsequent authentication (S48). The registration unit 240 further records, in the IC card 15, combination information indicating a combination of extracted features to be compared with the registered features in the subsequent authentication. The combination information to be recorded is (middle finger, little finger). The registration unit 240 further removes, from the IC card 15, the registered features and the combination information that have been already stored.

Although the combination information is recorded in the IC card 15 in the embodiment shown in FIG. 4, a medium in which the combination information is recorded is not limited to the IC card 15. Moreover, information to be recorded may be information that indirectly, rather than directly, specifies a combination. For example, when the times at which individual features are registered are known, the combination may be expressed by using the registration times. Moreover, when a combination of registered features at the registration time can be generated by an algorithm in a case where no combination information exists, the selection unit 230 may select extracted features subjected to comparison according to instructions issued from software that implements the algorithm.

Figure 5:
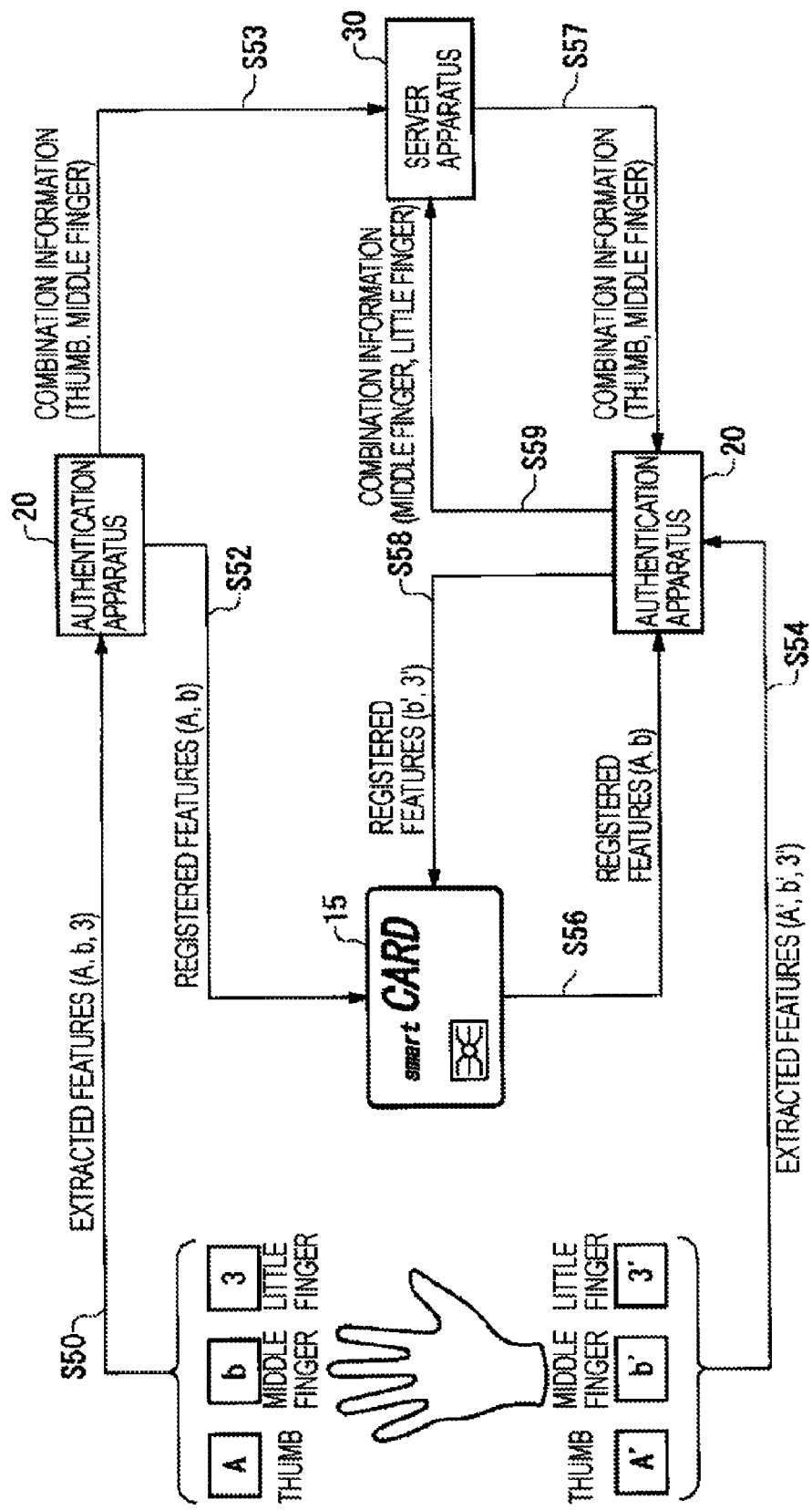
FIG. 5 shows a system and process flow in a case where combination information is registered in a server apparatus.

FIG. 5 shows a process flow where combination information is registered in the server apparatus 30. The outline of the process will now be described assuming registered information and combination information are recorded in the IC card 15 and the server apparatus 30, respectively. As a step of initialization, the extraction unit 200 extracts individual features of a thumb, a middle finger, and a little finger of a user (S50). It is assumed that the extracted features are denoted by A, b, and 3. The selection unit 230 selects a plurality of features from the extracted features according to a predetermined rule, and the registration unit 240 records the selected features in the IC card 15 as a plurality of registered features (S52). It is assumed that the registered features are the features A and b. The registration unit 240 sends the server apparatus 30 information indicating a combination of extracted features to be compared with the registered features so as to record the combination information in the server apparatus 30 (S53). The combination information to be recorded is denoted by (thumb, middle finger).

The extraction unit 200 extracts a plurality of features in response to an authentication request from the user (S54). It is assumed that the extracted features are denoted by A', b' and 3'. Moreover, the authentication unit 210 reads the registered features from the IC card 15 (S56) and receives the combination information from the server apparatus 30 (S57). For example, the authentication unit 210 may separately read a user ID or a card ID from the IC card 15 and search a database in the server apparatus 30 using the ID to read and receive the combination information. As a result, the features A and b are read as the registered features, and (thumb, middle finger) is received as the combination information. The authentication unit 210 compares a plurality of features (i.e., the feature A' of a thumb and the feature b' of a middle finger) with the registered features (A, b). If these combinations of features agree with each other as a result of the comparison, the authentication unit 210 determines that the authentication is successfully completed.

If the authentication is successfully completed, the selection unit 230 selects, from the extracted features, a different combination of features. It is assumed that the extracted features that have been selected are (b', 3'). Then, the registration unit 240 records the extracted features in the IC card 15 as registered features to be used in the subsequent authentication (S58). The registration unit 240 further sends the server apparatus 30 combination information indicating the new combination of features to be used in the subsequent authentication. For example, the registration unit 240 may send the server apparatus 30 combination information in association with a user ID or a card ID to record the combination information in the server apparatus 30 in association with that ID. The combination information to be recorded is (middle finger, little finger). The registration unit 240 further removes, from the IC card 15, the registered features that were previously stored.

The combination information may be recorded and managed in the IC card 15 or the server apparatus 30, as described with reference to FIGS. 4 and 5. When the combination information is recorded in the IC card 15, the traffic between the authentication apparatus 20 and the server apparatus 30 can be reduced. When the combination information is recorded in the server apparatus 30, the necessary recording capacity of the IC card 15 can be reduced.

In FIGS. 4 and 5, the number of registered features is two. However, the number of registered features may be any number so long as it is equal to or more than the minimum number necessary for user authentication. For example, when the accuracy of user authentication is sufficiently high, the number of registered features may be one. In this case, the extraction unit 200 extracts a plurality of features from an authentication object, and the authentication unit 210 compares a registered feature with the extracted features and authenticates the authentication object on the basis of the result of the comparison. Then, if the authentication is successfully completed, the selection unit 230 selects, from the extracted features, a feature that is different from the registered feature. Then, the registration unit 240 registers the selected feature as a registered feature to be used in the subsequent authentication of the authentication object.

Figure 6:
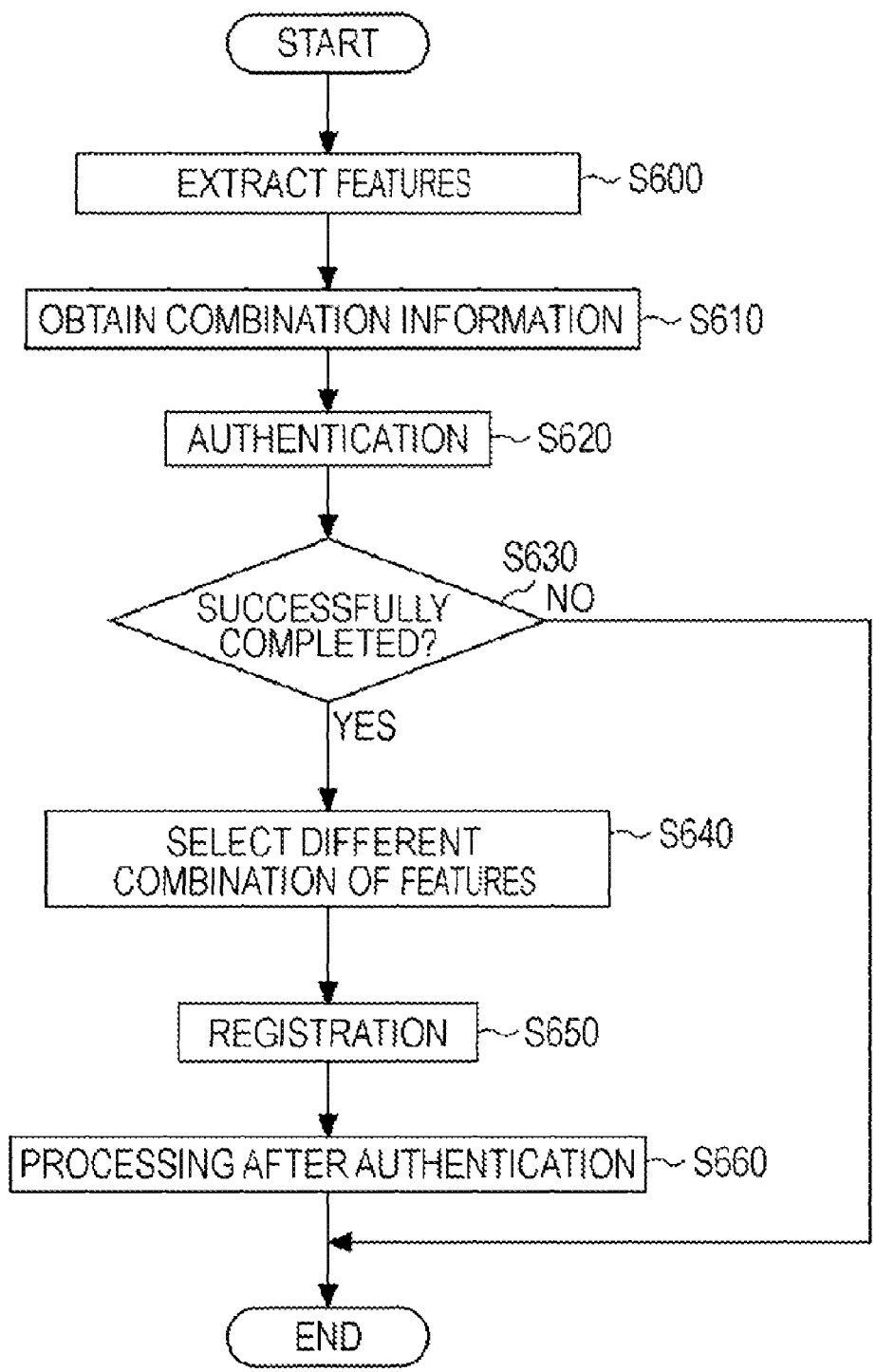
FIG. 6 shows a flowchart of an authentication process.

FIG. 6 shows a flowchart of an authentication process. The extraction unit 200 extracts a plurality of features from an authentication object (S600). The authentication unit 210 obtains combination information indicating a combination of extracted features to be compared with registered features that are registered in advance from the IC card 15 or the server apparatus 30 (S610). The authentication unit 210 compares the registered features with the extracted features and authenticates the user on the basis of the result of the comparison (S620).

If the authentication is successfully completed (S630: YES), the selection unit 230 selects, from the extracted features, a plurality of features forming a different combination other than that of the registered features that have been already registered (S640). Then, tire registration unit 240 registers the selected features as a plurality of registered features to be used in the subsequent authentication of the same user (S650). Then, the authentication apparatus 20 or the server apparatus 30 enables processing after authentication, such as displaying the status of a bank account in response to a user request or settlement processing in electronic commerce (S660).

Figure 7:
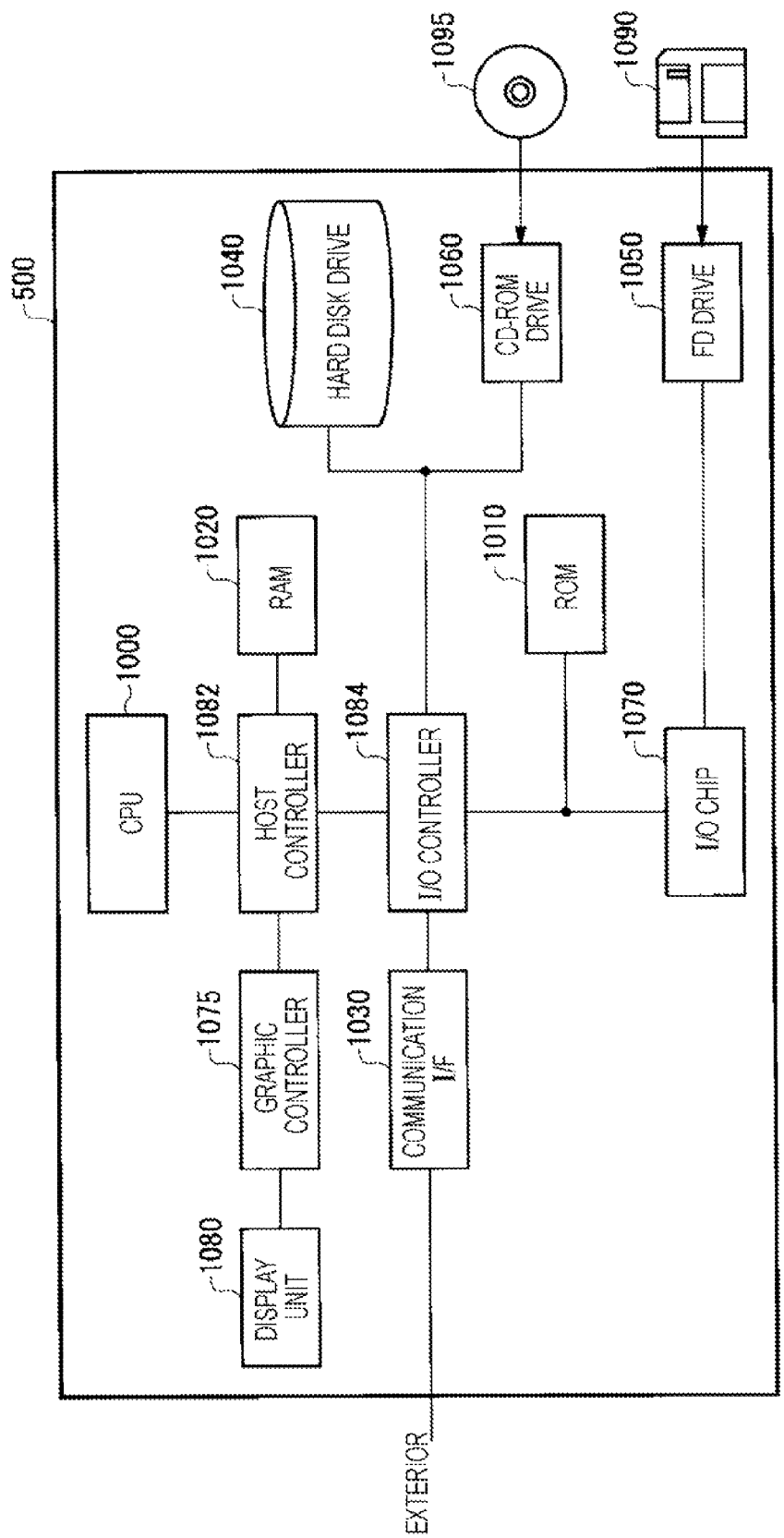
FIG. 7 shows an exemplary hardware configuration of an information processing apparatus functioning as the authentication apparatus or the server apparatus.

FIG. 7 shows an exemplary hardware configuration of an information processing apparatus 500 functioning as the authentication apparatus 20 or the server apparatus 30. The information processing apparatus 500 includes a CPU section that includes a CPU 1000, a RAM 1020, and a graphic controller 1075 that are connected to each other via a host controller 1082, an input-output section that includes a communication interface 1030, a hard disk drive 1040, and a CD-ROM drive 1060 that are connected to the host controller 1082 via an input-output controller 1084, and a legacy input-output section that includes a ROM 1010, a flexible disk drive 1050, and an input-output chip 1070 that are connected to the input-output controller 1084.

The host controller 1082 connects the RAM 1020 to the CPU 1000 and the graphic controller 1075, which access the RAM 1020 at a high transfer rate. The CPU 1000 operates according to programs stored in the ROM 1010 and the RAM 1020 and controls individual components. The graphic controller 1075 obtains image data generated in a frame buffer provided in the RAM 1020 by the CPU 1000 or other device and displays the image data on a display unit 1080. Instead of this arrangement, the graphic controller 1075 may include the frame buffer, which stores image data generated by the CPU 1000 or other device.

The input-output controller 1084 connects the host controller 1082 to the communication interface 1030, the hard disk drive 1040, and the CD-ROM drive 1060, which are relatively high-speed input-output units. The communication interface 1030 communicates with external devices via a network. The hard disk drive 1040 stores programs and data used by the information processing apparatus 500. The CD-ROM drive 1060 reads a program or data from a CD-ROM 1095 and supplies the program or data to the RAM 1020 or the hard disk drive 1040.

Moreover, the ROM 1010, the flexible disk drive 1050, the input-output chip 1070, and the like, which are relatively low-speed input-output units, are connected to the input-output controller 1084. The ROM 1010 stores a boot program executed by the CPU 1000 when the information processing apparatus 500 is activated, programs that depend on the hardware of the information processing apparatus 500, and other programs. The flexible disk drive 1050 reads a program or data from a flexible disk 1090 and supplies the program or data to the RAM 1020 or the hard disk drive 1040 via the input-output chip 1070. The input-output chip 1070 connects various types of input-output units via, for example, a parallel port, a serial port, a keyboard port, mouse port, and the like, as well as the flexible disk 1090.

Programs provided to the information processing apparatus 500 are stored in a recording medium, such as the flexible disk 1090, the CD-ROM 1095, or an IC card, and provided by the user. The programs are read from the recording medium via the input-output chip 1070 and/or the input-output controller 1084, and installed and executed in the information processing apparatus 500. Operations performed by the information processing apparatus 500 according to the programs are the same as the operations in the authentication apparatus 20 or the server apparatus 30 described in FIGS. 1 to 6, and thus the description of the operations is omitted.

The aforementioned programs may be stored in an external storage medium. In addition to the flexible disk 1090 and the CD-ROM 1095, an optical recording medium such as a DVD or a PD, a magneto-optical recording medium such as an MD, a tape medium, a semiconductor memory such as an IC card, or the like can be used as the storage medium. Moreover, the programs may be provided to the information processing apparatus 500 via a network using, as the recording medium, a storage unit, such as a hard disk or a RAM, provided in a server system connected to a private communication network, the Internet, or the like.

While the present invention has been described with reference to the embodiments, the technical scope of the present invention is not limited to the scope described in the foregoing embodiments. It is apparent to those skilled in the art that various changes or improvements can be made in the foregoing embodiments. It is apparent from the description in the appended claims that such changed or improved embodiments may be included in the technical scope of the present invention.

What is claimed is:

1. A system for authenticating an authentication object that represents a user by comparing features that are extracted from the authentication object with features previously registered in an information recording medium associated with the user, the number of registered features recorded in said information recording medium being fewer than the number of extracted features, the system comprising:
   an extraction unit for extracting a plurality of features from the authentication object in response to a user authentication request;
   an authentication unit for reading a combination of registered features previously recorded on said information recording medium, comparing the registered features with corresponding ones of the extracted features and authenticating the authentication object based on a result of the comparison;
   a selection unit for responding to a successful authentication by selecting, from the extracted features, a new combination of features different from the combination previously recorded on said information recording medium; and
   a registration unit for recording the selected new combination of features on said information recording medium in place of the previously recorded registered features.

2. The system according to claim 1, wherein the extraction unit reads a plurality of features from an authentication object at substantially the same time and extracts a plurality of extracted features.

3. The system according to claim 1, wherein the system authenticates a user who is an authentication object by comparing extracted biometric features of the user with corresponding features previously recorded in the information recording medium, and
   the selection unit combines features that are parts of fingerprints in relation to a plurality of fingers that are different from each other to select the combined features as a newly selected combination of features to be recorded in the information recording medium.

4. The system according to claim 1, wherein the selection unit determines whether one or more combinations of features are prohibited from being used as registered features and selects a combination of features from other than said prohibited combinations.

5. The system according to claim 1, wherein the selection unit selects a combination of extracted features to be recorded in the information recording medium according to a predetermined rule each time the authentication is successfully completed, and responsive to a notice that at least part of the extracted features are compromised, changes the predetermined rule to another rule to be used in a subsequent authentication operation.

6. The system according to claim 1, wherein information recorded in the information recording medium includes a medium identifier, and
   the selection unit selects a combination of extracted features to be recorded in the information recording medium according to a predetermined rule every time the authentication is successfully completed, and responds to a determination that the current medium identifier is different from the medium identifier detected on the prior authentication operation by changing the predetermined rule to another rule.

7. A computer-implemented method for authenticating a user by comparing features that are extracted from the user with features that are registered in advance as a combination of features recorded on an information recording medium associated with the user, the method comprising:
   extracting a plurality of features from the user;
   comparing at least some of the extracted features with a previously registered combination of features recorded on the information recording medium; the number of the registered features being fewer than the number of the extracted features, and authenticating the user based on a result of the comparison;
   if the authentication is successfully completed, selecting a new combination of extracted features; and
   registering the new combination for use in a subsequent authentication of the user by recording the new combination on the information recording medium in place of the previously registered combination on the information recording medium.

8. The computer-implemented method according to claim 7 wherein the previously registered combination of features was selected in accordance with a particular rule and selecting a new combination of extracted features comprises selecting a new rule for forming the new combination.

9. The computer-implemented method according to claim 8 wherein selecting a new combination further includes excluding any new combination consisting of extracted features which have been identified as being compromised.

10. A computer program product comprising a machine readable storage medium embodying program instructions, said program instructions when loaded into and executed by a computer causing the computer to perform a method of authenticating a user comprising the steps of:
    extracting a plurality of features from the user;

reading a previously registered combination of user features from an information recording medium associated with the user; the number of the previously registered features being fewer than the number of the extracted features;

comparing at least some of the extracted features with the previously registered combination of features and authenticating the user based on a result of the comparison;

if the authentication is successfully completed, selecting a new combination of extracted features; and registering the new combination by recording the new combination on the information recording medium in place of the previously registered combination for use in a subsequent authentication of the user.

11. The computer program product according to claim 10 wherein the previously registered combination of features was selected in accordance with a particular rule and the program instructions for causing selection of a new combination further comprise program instructions for selecting a different rule for forming the new combination.

12. The computer program product according to claim 11 wherein program instructions for selecting a new combination further includes program instructions for excluding any new combination of extracted features which have been identified as being compromised.

* * * * *